(12) United States Patent
Albert et al.

(10) Patent No.: US 10,488,550 B2
(45) Date of Patent: Nov. 26, 2019

(54) OPTOELECTRONIC DETECTION OF OBJECTS BY MEASUREMENT OF ANGULAR POSITION TO DETERMINE RELATIVE MOVEMENT OF A DEFLECTION UNIT

(71) Applicant: SICK AG, Waldkirch (DE)

(72) Inventors: Magnus Albert, Waldkirch (DE); Boris Baldischweiler, Waldkirch (DE); Michael Engler, Waldkirch (DE); Joachim Krämer, Waldkirch (DE); Jörg Sigmund, Waldkirch (DE)

(73) Assignee: SICK AG, Waldkirch (DE)

( * ) Notice: Subject to any disclaimer, the term of this patent is extended or adjusted under 35 U.S.C. 154(b) by 184 days.

(21) Appl. No.: 15/626,411

(22) Filed: Jun. 19, 2017

(65) Prior Publication Data

US 2017/0371066 A1 Dec. 28, 2017

(30) Foreign Application Priority Data

Jun. 24, 2016 (DE) .......................... 10 2016 111 615

(51) Int. Cl.
*G01V 8/22* (2006.01)
*G01B 11/26* (2006.01)
(Continued)

(52) U.S. Cl.
CPC ................ *G01V 8/22* (2013.01); *G01B 11/26* (2013.01); *G01C 15/002* (2013.01);
(Continued)

(58) Field of Classification Search
CPC .............. G01S 7/4817; G01S 17/42; G01S 2007/4975; G01S 27/48; G01B 11/26;
(Continued)

(56) References Cited

U.S. PATENT DOCUMENTS 5,450,202 A * 9/1995 Tisue ..................... G01D 5/305
318/561
6,246,502 B1 * 6/2001 Okada .................. G02B 26/127
340/435

(Continued)

FOREIGN PATENT DOCUMENTS

DE 4340756 A1 6/1994
DE 102006041307 A1 3/2008
(Continued)

OTHER PUBLICATIONS

German Office Action dated Jan. 25, 2017 in corresponding German Patent Application No. 102016111615.7.

*Primary Examiner* — Que Tan Le
*Assistant Examiner* — Jennifer D Bennett
(74) *Attorney, Agent, or Firm* — Nath, Goldberg & Meyer; Jerald L. Meyer; Stanley N. Protigal (57) ABSTRACT

An optoelectronic sensor (10) for detecting objects comprises a light transmitter (12) for transmitting a light beam (16), a rotatable deflection unit (18) for periodically deflecting the light beam (16), an angle measuring unit (30) for determining an angular position of the deflection unit (18), a light receiver (26) for generating a reception signal from a reflected light beam (22), wherein the angle measuring unit (30) comprises an image sensor (32) moving with the deflection unit and arranged in the direction of a stationary part (44, 46) of the sensor (10), or a stationary image sensor (32) arranged in the direction of the deflection unit (18), further comprising a computing unit (36) to determine a relative movement of the deflection unit (18) with respect to the sensor (10) from a signal of the image sensor (32).

15 Claims, 5 Drawing Sheets

(51) Int. Cl.
    *G01S 17/42*     (2006.01)
    *G02B 26/10*     (2006.01)
    *G01S 7/481*     (2006.01)
    *G01C 15/00*     (2006.01)
    *G02B 26/08*     (2006.01)
    *G02B 27/48*     (2006.01)
    *G01S 7/497*     (2006.01)

(52) U.S. Cl.
    CPC ............ *G01S 7/4817* (2013.01); *G01S 17/42* (2013.01); *G02B 26/0816* (2013.01); *G02B 26/10* (2013.01); *G01S 2007/4975* (2013.01); *G02B 27/48* (2013.01)

(58) Field of Classification Search
    CPC ...... G01V 8/22; H04N 1/113; G02B 26/0816; G02B 26/10; G02B 27/48; G01C 15/002
    See application file for complete search history.

(56) References Cited

U.S. PATENT DOCUMENTS

| | | | | |
|---|---|---|---|---|
| 8,570,502 | B2* | 10/2013 | Richter | G02B 26/105 356/138 |
| 8,842,262 | B2 | 9/2014 | Haneda et al. | |
| 2003/0234923 | A1* | 12/2003 | Hipp | G01S 7/4814 356/141.2 |
| 2008/0158555 | A1* | 7/2008 | Mori | G01S 7/481 356/239.2 |
| 2010/0200753 | A1* | 8/2010 | Westaway | F21V 17/02 250/338.1 |
| 2012/0154786 | A1* | 6/2012 | Gosch | G01S 7/4817 356/5.01 |
| 2012/0188559 | A1* | 7/2012 | Becker | G01C 15/002 356/612 |

FOREIGN PATENT DOCUMENTS

| | | |
|---|---|---|
| DE | 102007003852 A1 | 7/2008 |
| DE | 102009035336 B3 | 11/2010 |
| DE | 202013102440 U1 | 10/2014 |
| DE | 102014105781 A1 | 10/2015 |
| EP | 1813961 B1 | 9/2009 |
| EP | 2237065 A1 | 10/2010 |
| EP | 2469296 B1 | 10/2012 |
| EP | 2626671 A1 | 8/2013 |

* cited by examiner

OPTOELECTRONIC DETECTION OF OBJECTS BY MEASUREMENT OF ANGULAR POSITION TO DETERMINE RELATIVE MOVEMENT OF A DEFLECTION UNIT

FIELD

The invention relates to an optoelectronic sensor and a method for the detection of objects in a monitoring area.

BACKGROUND

In a laser scanner, a light beam generated by a laser periodically sweeps over a monitoring area by means of a deflecting unit. The light is remitted by objects in the monitoring area and evaluated in the laser scanner. The angular position of the object is detected from the angular position of the deflecting unit, and additionally the distance of the object from the laser scanner is detected from the light time of flight using the speed of light. For conventional laser scanners, two basic principles are known for determining the light time of flight. In phase-based methods, the continuous transmission light is modulated, and the phase shift of the received light with respect to the transmitted light is evaluated. In pulse-based methods or pulse time of flight methods, the transmitter is operated in a single pulse mode with comparatively high pulse energies, and the laser scanner measures object distances on the basis of the time of flight between the transmission and reception of a single light pulse. In a pulse averaging method known for example from EP 2 469 296 B1, a plurality of individual pulses are transmitted for a measurement, and the reception pulses are statistically evaluated.

With the angle and distance data, the location of an object in the monitoring area is detected in two-dimensional polar coordinates. This can be used to determine object positions or their contour. The third spatial coordinate can also be detected by a relative movement in the transverse direction, for example by an additional degree of freedom of the deflection unit in the laser scanner, or in that the object is moved relative to the laser scanner. Thus, three-dimensional contours can also be measured.

Laser scanners are not only used for general measurement tasks, but also in safety technology to monitor a source of danger, for example a dangerous machine. Such a safety laser scanner is known from DE 43 40 756 A1. A protection field is monitored which must not be entered by personnel during operation of the machine. In case the laser scanner detects an inadmissible protection field intrusion, like a leg of a person, it triggers an emergency stop of the machine. Other intrusions into the protection field, for example by stationary machine parts, can be taught in advance as permissible. Often, warning fields are arranged in front of the protection fields, where intrusions at first only cause a warning, in order to prevent the protection field intrusion and thus the emergency stop in advance, therefore increasing availability of the system. Safety laser scanners are mostly pulse-based.

Safety laser scanners have to operate particularly reliable and thus to meet severe safety requirements, for example the EN13849 standard for machine safety and the device standard EN61496 for contactless protective devices (ESPE). In order to meet these safety standards, a number of measures must be taken, such as safe electronic evaluation by redundant, divers electronics, function monitoring or, in particular, monitoring a contamination of optical components such as a front screen.

In DE 20 2013 102 440 U1, a front screen monitoring of a laser scanner is done by a separate transmitter and receiver by means of which monitoring beams are directed onto the front screen and are received after reflection. EP 2 237 065 A1 uses a testing device, which is arranged on a rotor, and a reflector element arranged outside the front screen. EP 1 813 961 B1 proposes, in a camera, to record the reflex on the inside of a front disk with an image sensor, and to evaluate the same for a contamination detection.

In order to obtain reliable data over the entire detection area, there are high requirements not only for the actual measurement of the distances to detected objects, but also for the accuracy of the angle measurement. Conventionally, an encoder disk with regular openings is used for this purpose. A fork light barrier transmits light through the openings of the rotating encoder disk, and a rotational speed or angular position, respectively, is calculated by determining the number of beam interruptions per time. In this case, a relatively large number of components including a rather complex mechanism for the encoder disk and the fork light barrier are used. Individual openings of the encoder disk may be closed during operation by interfering particles or dust, which leads to maintenance requirements or even measurement errors and failure. The forked light barrier is affected by ambient light.

DE 10 2006 041 307 A1 discloses an optoelectronic sensor arrangement, for example a reflective scanning sensor, having an image sensor evaluating successive images in order to detect a relative movement of a detected object. However, this is in no way related to a laser scanner or its scanning movement.

EP 2 626 671 A1 relates to position determination with a scanning unit moving with respect to a surface and having an image sensor. A computing unit determines a travel path or velocity from a difference between successively detected light intensity patterns. This is used for example to determine a position of a vehicle on a transport route.

SUMMARY

It is therefore an object of the invention to provide a reliable determination of the angular position in a sensor.

This object is satisfied by an optoelectronic sensor, in particular a laser scanner, for detecting objects in a monitoring area, the sensor comprising a light transmitter for transmitting a light beam, a rotatable deflection unit for periodically deflecting the light beam in the monitoring area, an angle measuring unit for determining an angular position of the deflection unit, a light receiver for generating a reception signal from a reflected light beam being remitted or reflected by the objects, and an evaluation unit configured to evaluate the reception signal for detecting the objects, wherein the angle measuring unit comprises an image sensor moving with the deflection unit and arranged in the direction of a stationary part of the sensor, or a stationary image sensor arranged in the direction of the deflection unit, and wherein the sensor further comprises a computing unit configured to determine a relative movement of the deflection unit with respect to the sensor from a signal of the image sensor.

The object is also satisfied by a method for detecting objects in a monitoring area, the method comprising the steps of transmitting a light beam, periodically deflecting the light beam in the monitoring area by means of a deflection unit, generating a reception signal from a reflected light beam remitted or reflected by the objects, and evaluating the reception signal for detecting the objects, wherein a respective angular position of the light beam transmission is determined, wherein for measuring the angular position an image sensor which is arranged in the direction of a stationary part is moved with the deflection unit, or a stationary image sensor is arranged in the direction of the deflection unit, and wherein a relative movement of the deflection unit with respect to the stationary part is determined from the signal of the image sensor.

The sensor comprises a rotatable scanning unit, for example a rotating mirror or a rotating optical or measuring head having a light transmitter and receiver, and thus scans a monitoring area with a light beam. With additional tilt of the deflection unit, the monitoring area is extended to a three-dimensional spatial area. A reception signal generated from the returning light beam is evaluated to detect whether there is an object. The sensor in particular is configured as a distance measuring device in that the light time of flight between transmission and reception of the light beam and thus the distance to the object is determined. An angle measuring unit determines the respective angular position of the detection.

The invention starts from the basic idea of replacing the conventional encoder disk including the fork light barrier in the angular measuring unit. For this purpose, an image sensor moving with the deflection unit is provided, which is arranged in the direction of a stationary part of the sensor, such as a housing or a front disk. From the perspective of the image sensor, the stationary part is in motion. Alternatively, the image sensor is stationary, i.e. does not take part in the rotary movement, and is arranged in the direction of the deflection unit. This also results in a relative movement. By evaluating the signal of the image sensor from different points in time and thus rotary positions, in particular an image sequence, the relative movement is evaluated in a computing unit and thus the angular position is determined for example from the rotational speed. The computing unit can be part of the angle measuring unit, but can also partially or as a whole be part of the evaluation unit for evaluating the reception unit of the light beam scanning the monitoring area.

The invention has the advantage that the angle measuring unit becomes more robust, reliable and cost-effective. In addition, it is possible to make the angular measuring unit very compact and thus to reduce the size of the sensor. Furthermore, the signal of the image sensor can even be used for additional measurements which significantly increase the features and the robustness of the entire sensor, such as ambient or external light measurement, measurement of a front screen contamination, brightness measurement, additional signatures of the angles or the like.

The computing unit preferably is configured to determine the relative movement with an optical flow method. Throughout this specification, preferably refers to a preferred, but completely optional feature. This is an established and robust method to optically determine relative movements. In simplified terms, image features are identified in an image, correspondences of the image features are found in another image, and the movement velocity including a direction is determined from the resulting vector field of the offsets of the image features and the time interval between taking images. Optical flow is a powerful tool whose determination and evaluation in this application is greatly facilitated by the knowledge that all image features can only move together due to the framework conditions.

The angle measuring unit preferably comprises an illumination unit. This ensures sufficient amplitude and structure of the image sensor signal. The illumination in particular is a laser illumination whose laser speckles form a pronounced structure and thus image features for determining optical flow.

The angle measuring unit preferably has an integrated system which comprises at least the image sensor and the computing unit. Preferably, an illumination is also integrated. Such integrated systems or chips are used, for example, in computer mice. Therefore they are very mature, thus robust and available at low cost. In using an integrated system, less specific circuit board area or other elements are required in the sensor. The evaluation in the computing unit in a chip not specifically designed for the sensor does not yet generate an angular position, but for example only a speed signal. The subsequent computation of an angular position taking account of the internal sensor geometry could also be done in the computing unit of the angle measuring unit, but preferably is done by the evaluation unit of the sensor. At least some commercial chips for computer mice also offer the possibility to read out the image data itself. Then, the functionality of the computing unit can be shifted into the evaluation unit, and also evaluations of the image data independent from angle measurements can be done.

At least one reference marking preferably is arranged at the stationary part or at the deflection unit in a known angular position. For example, this is a particularly bright mark, a reflector or another easily identifiable feature. This in particular determines a zero position, or a slip occurring due to slightly inexact determination of the respective relative movement is periodically compensated before a relevant inaccuracy can arise. A plurality of reference markings can also be arranged in several angular positions, up to providing a circumferential ring with regular reference markings.

The deflection unit preferably comprises a rotary mirror, wherein the image sensor is arranged at the rear side of the rotary mirror. There, the image sensor or an integrated chip with the image sensor and the computing unit can easily be accommodated, and because of the rotary mirror arranged therebetween, there are no problems with stray light from the angle measuring unit entering the actual measuring channel of the scanning beam or vice versa.

Alternatively, the deflection unit preferably is configured as a rotating scanning unit which comprises the light transmitter and the light receiver, wherein the image sensor is arranged on the scanning unit at an angular offset with respect to the light transmitter and the light receiver. Here, rather than a rotary mirror, there is provided a measuring head including the light transmitter and the light receiver of the scanning beam, which rotates with respect to a base unit having a housing, front screen, and motor as well as possibly further components. By means of an angular offset between image sensor on the one hand and light transmitter and light receiver on the other, there also is enough room to prevent mutual interference by stray light. This is particularly true for a sufficient angular offset preferably in the vicinity of 180°.

The sensor preferably comprises a front screen, with the image sensor being arranged in the direction of the front screen, wherein the computing unit is configured to detect a contamination of the front screen from the signal of the image sensor. In this embodiment, the image sensor detects at least a part of the front screen also transmitted by the scanning beam. In addition, another stationary part can be detected, for example a housing section. The signal of the image sensor is used for a second function in addition to determining the angular position. With a contamination of the front screen, its scattering properties and thus contrast and signal strength in the image data of the image sensor is changed. From that, the contamination is detected, whether binary after a threshold evaluation or graded in a quantitative contamination measure. The contamination information even is available with a very high angular resolution, if desired. It should be remembered that although the evaluation is done in the computing unit, the computing unit itself can be partially or as a whole be part of the evaluation unit. Therefore, the contamination monitoring can be carried out already in the angle measuring unit or in the actual sensor evaluation.

A reference signal for a front screen without contamination preferably is stored in the computing unit. The contamination measurement therefore is calibrated with a front screen which is sufficiently clean at least from a functional point of view, and deviations are detected during the later operation.

The sensor preferably is configured as a safety sensor and comprises a safe output, wherein the evaluation unit is configured to determine whether there is an object in a protected field within the monitoring area and to then output a safety-related stop signal via the safe output. A safety sensor is a safe sensor meeting the requirements of a safety standard as described in the introduction, and can therefore in particular be used for the safety of persons at a source of danger. A contamination measurement contributes to meeting these standard requirements. However, this does not mean that other sensors, which are not safe according to these standards, do not benefit from the contamination measurement.

The evaluation unit preferably is configured to output a safety-related stop signal when there is a contamination of the front screen in connection with a protected field. More generally, contamination is critical only if it, firstly, does not allow reliable detection, and, secondly, affects a field of view that is also relevant to the application. In a safety-related application, this is defined by the protection fields, since the detection of objects outside protection fields is not relevant to safety. However, a maintenance request can be useful regardless of whether the operation is still continued.

The computing unit preferably is configured to also detect a relative movement of the deflection unit with respect to the stationary part in a direction transverse to the rotary movement of the deflection unit. This can for example be useful in a sensor with extended monitoring area which tilts its monitoring plane and thus scans a three-dimensional spatial area. Also in a sensor with a fixed scanning plane, vertical movement can occur due to imbalance or mechanical impacts, so that a diagnosis for monitoring the movement behavior is enabled.

The inventive method can be modified in a similar manner and shows similar advantages. Further advantageous features are described in the sub claims following the independent claims in an exemplary, but non-limiting manner.

In the inventive method, the relative movement preferably is determined from the signal of the image sensor with an optical flow method. The image sensor preferably is arranged in the direction of a front screen, wherein additionally a contamination of the front screen is detected from the signal of the image sensor. The contamination preferably is detected by comparison with a reference signal for a front screen without contamination.

BRIEF DESCRIPTION OF THE DRAWINGS

The invention will be explained in the following also with respect to further advantages and features with reference to exemplary embodiments and the enclosed drawing. The Figures of the drawing show in.

DETAILED DESCRIPTION

Figure 1:
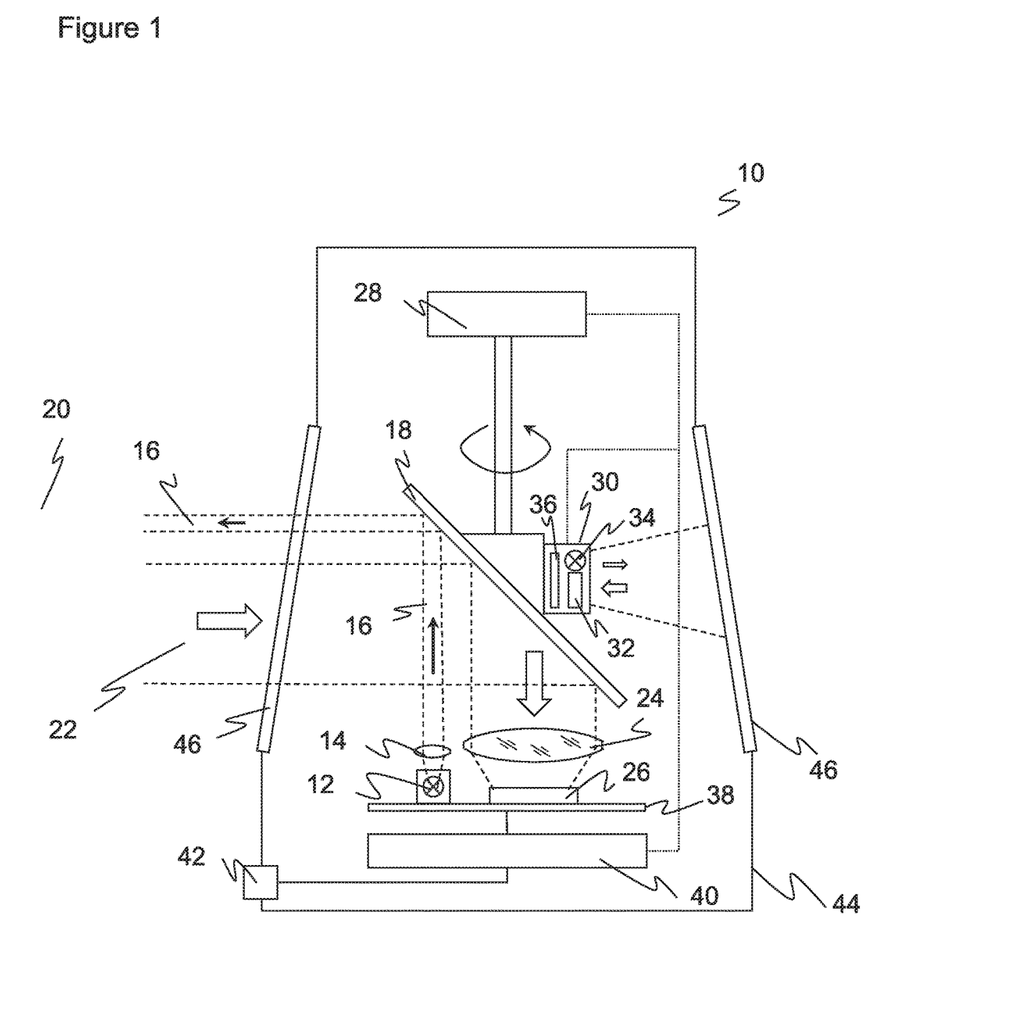
FIG. 1 a schematic sectional view of a laser scanner with an angle position determination based on a moving image sensor.

FIG. 1 shows a schematic sectional view through a laser scanner 10. A light transmitter 12, for example having a laser light source in the infrared or another spectrum, generates a transmission light beam 16 by means of transmission optics 14, which is deflected into a monitoring area 20 by deflection means 18. In case the transmission light beam 16 impinges on an object in the monitoring area 20, remitted light 22 returns to the laser scanner 10 and is detected, via the deflection unit 18 and reception optics 24, by a light receiver 26, for example a photo diode or an APD (Avalanche Photo Diode).

In this embodiment, the deflection unit 18 is configured as a rotary mirror which is continuously rotated by a motor 28. The respective angular position of the motor 28 or the deflection unit, respectively, is detected by an angle measuring unit 30 which will be described below, for example comprising an image sensor 32, an illumination unit 34 and a computing unit 36

In the course of the rotary movement, the transmission beam 16 generated by the light transmitter 12 scans the monitoring area 20. The configuration of transmission optics 14 and reception optics 24 may vary, for example with a beam-shaping mirror as the deflection unit, a different arrangement of lenses, or additional lenses. In particular, laser scanners are also known in a co-axial arrangement of light transmitter 12 and light receiver 26. In the embodiment as shown, light transmitter 12 and light receiver 26 are accommodated on a common circuit plate 38. Again, this is only an example, because separate circuit boards as well as different arrangements for example with mutual height offset could be provided.

Now, if remitted light 22 from the monitoring area 20 is received by light receiver 26, the angular position of the object in the monitoring area 20 can be detected from the angular position of the deflection unit 18 measured by the angle measuring unit 30. In addition, the light time of flight from transmission of a light signal up to its reception after reflection at an object in the monitoring area 20 preferably is determined, and the distance of the object from the laser scanner 10 is obtained using the speed of light.

This evaluation takes place in an evaluation unit 40, which therefore is connected to the light transmitter 12, the light receiver 26, the motor 28, and the angle measuring unit 30. Thus, with angle and distance, two-dimensional polar coordinates of all objects in the monitoring area 20 are available. In an application of safety technology, the evaluation unit 40 monitors whether there is an inadmissible object in a protection field defined within the monitoring area 20. In that case, a stop signal is output to a monitored source of danger, for example a monitored machine, via a safe output 42 (OSSD, Output Signal Switching Device). In these safety applications, by appropriate measures, the laser scanner is a safety laser scanner according to a standard as mentioned in the introduction. In other embodiments, instead of the safe output 42, or in addition thereto, an interface for the output of measurement data or for example for parameterizing the lasers scanner 10 is provided.

The functional components as explained are arranged in a housing 44 which comprises a front screen 46 for light exiting and entering the laser scanner 10.

In FIG. 1, the angle measuring unit 30 is only shown very schematically. Preferably, it is a fully integrated chip, which is otherwise used, for example, in computer mice. Optics which may be necessary are not shown, where depending on the design of the laser scanner 10, separate optics of the angle measuring unit 30 may be provided, or regions of existing optics can be used for example in the form of specific beam-shaping zones.

The image sensor 32 takes images sequences, the illumination unit 34 providing sufficient light and in particular also structure by speckle patterns. The computing unit 36, by comparison of the images taken at different times, determines a relative movement of the angle measuring unit 30 with respect to the detected scenery. The usual method in computer mice for this purpose is an evaluation of the optical flow, which is not explained in any detail because it is known per se. The principle is to evaluate the movement of image features in the image sequence, these image features for example being laser speckles of the illumination unit 34. Although using a cost-effective, robust and commercially available chip has its advantages, using separate components, i.e. mainly an images sensor 32 with connected computing unit 36, is also conceivable. The functionality of the computing unit 36 can also partially or completely be implemented in the evaluation unit 40.

The angle measuring unit 30 is mounted on the rotating deflection unit 18, preferably on a rear side of the rotary mirror, and its image sensor 32 is arranged in the direction of the front screen 46. Alternatively, the angle measuring unit 30 can also be arranged in the direction of another stationary part of the laser scanner 10, for example the housing 44. Thereby, the image sensor 32 moves with respect to the detected stationary part of the laser scanner 10, and the computing unit 36 is able to determine the relative movement and thus the rotational speed. A typical relative speed is of the order of 5-10 m/s. The internal geometry of the laser scanner 10 still needs to be taken into account, for example the distance between angle measuring unit 30 and front screen 46, and an angular position is determined from that. These calculations can also be carried out by the computing unit 36. Particularly in case that the angle measuring unit 30 is an integrated chip not specifically designed for laser scanners, such calculations can also be implemented in the evaluation unit 40.

Since the angle measuring unit 30 moves relative to the evaluation unit 40, it is necessary to transmit signals between moving and stationary components and to supply the angle measuring unit with power. In FIG. 1, this is shown only schematically as a connecting line, in practice, an implementation via a sliding contact for example through the rotational axis of the motor 28 or a wireless interface would be conceivable.

The orientation or arrangement of the angle measuring unit 30 in the direction of the front screen 46 makes another function possible, namely monitoring for contamination of the front screen 46. For this purpose, the data of the image sensor 32 is evaluated another time, for example with regard to amplitude and contrast. At least some commercially available integrated chips being used as angle measuring unit 30 not only provide the speed, but also such measured values like contrast or signal strength, in some cases also raw image data. Dirt particles on the front screen 46 influence, by scattering the light transmitted by the illumination unit 34, the speckle pattern which is detected by the image sensor 32, and therefore change contrast and signal strength. It is thus possible to detect a degree of contamination of the front screen 46. Preferably, reference data is detected and stored in advance in a calibration with clean front screen 46, so that later on contamination can be evaluated by comparison.

While a conventional front screen monitoring only has a few separate measurement channels, even contamination information with high angular resolution can be obtained by the rotating angle measuring unit 30, and with suitable arrangement from the relevant part of the front screen 46 which is also used for the transmission light beam 16 and the remitted light 22. In a simple contamination monitoring, there is only a binary decision whether the laser scanner 10 is still operable. The angle-resolved contamination information also allows for more differentiated considerations. For example, it is evaluated whether a contaminated region of the front screen 46 relates to an angular range with a protection field. While an impairment of the monitoring of a protected field immediately has to result in a safety-related stop, a contamination in angular regions without relevance for safety could be accepted and thus the availability of the laser scanner 10 be increased.

Figure 2:
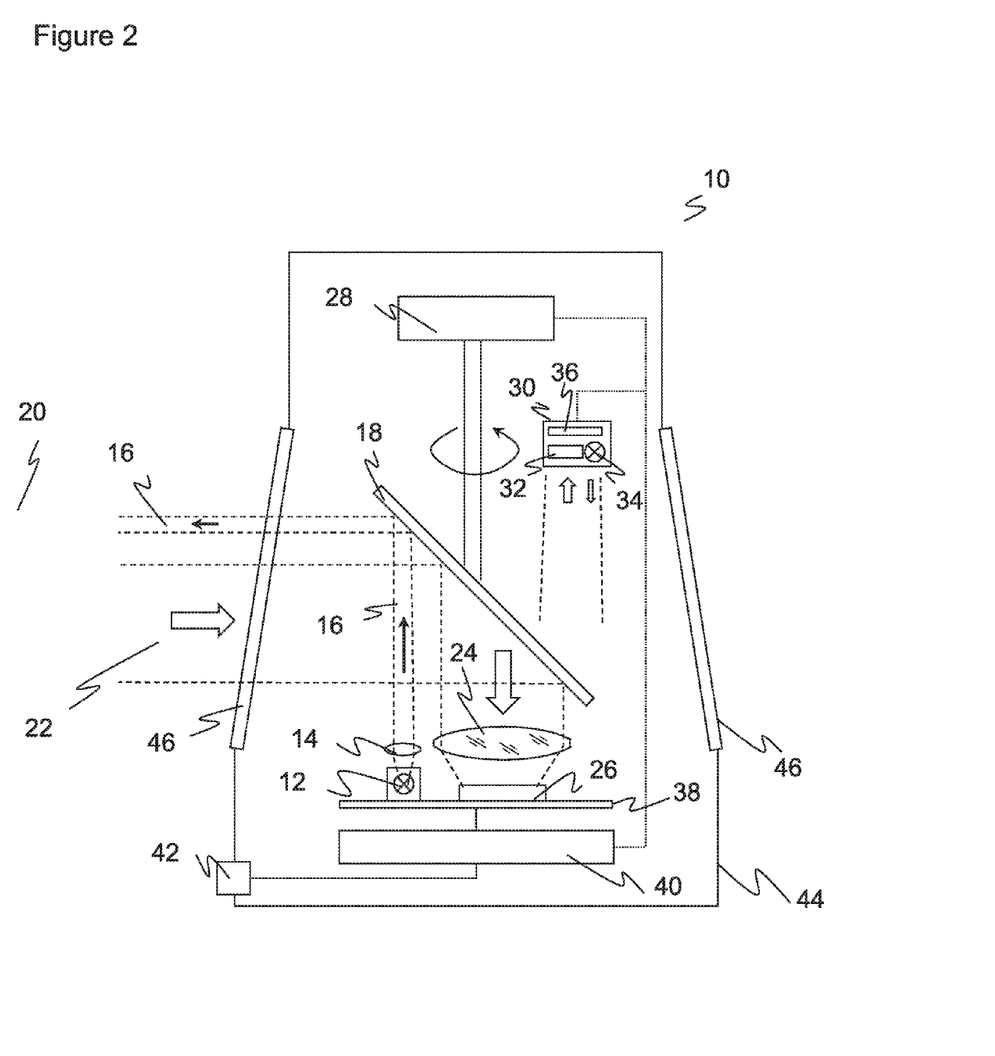
FIG. 2 a schematic sectional view of another embodiment of a laser scanner similar to FIG. 1, but with stationary image sensor.

FIG. 2 shows a sectional view of a further embodiment of a laser scanner 10. Throughout the specification, the same reference numbers are used for the same or corresponding features which are not again explained. Here, in contrast to the embodiment according to FIG. 1, the angle measuring unit 30 is not moved together with the deflection unit 18, but is arranged in the laser scanner 10 in a stationary manner in a direction towards the deflection unit 18, which thus is in relative movement. Determination of the rotational speed and therefore the angular position is done in an analogous manner. The arrangement has the advantage that for connecting angle measuring unit 30 and evaluation unit 40 no data connection between moving and stationary parts needs to be provided. Due to the tilt of the deflection unit 18 with respect to the angle measuring unit 30, the distance varies in the course of a revolution. This should be taken into account in the detection of the angle measuring unit 30, depending on the method which is implemented therein. It can also be avoided by additionally arranging a simple rotating horizontal disk above the deflection unit 18.

Figure 3:
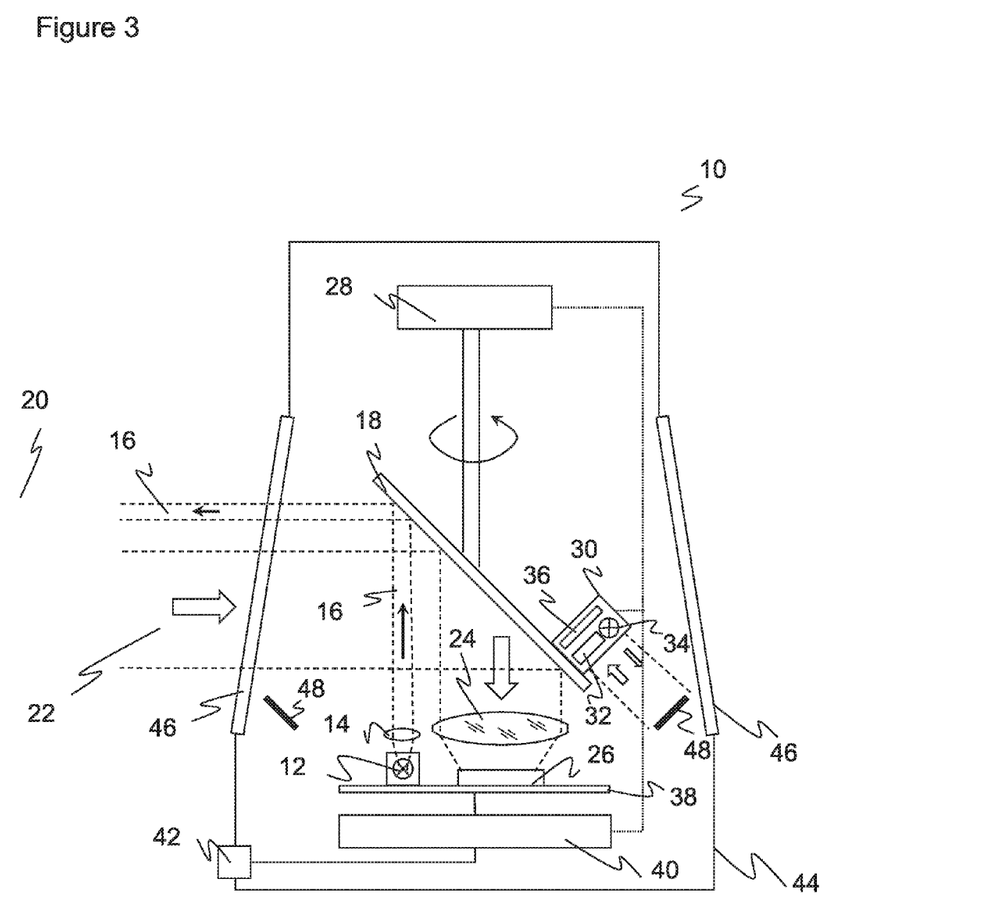
FIG. 3 a schematic sectional view of another embodiment of a laser scanner with a variant of the arrangement and perspective of the image sensor.

FIG. 3 shows a sectional view of a further embodiment of a laser scanner 10. Here, the angle measuring unit 30 again rotates, arranged on the deflection unit 18, but at a different position and with a tilt, so that instead of the front screen 46, a region in the stationary base of the laser scanner 10 is detected. Of course, as an alternative, only the position or only the tilt angle may be varied.

In addition, a reference marking 48 is provided in the detection region of the image sensor 32, which is easily and reliably recognizable in image data, for example due to being particularly bright or reflective or carrying a specific code. A similar marking could also be arranged on the front screen 46, preferably somewhat above or below the transmission region of transmission light beam 16 and remitted light 22. The reference marking 48 for example is used to define a zero position or to compensate a possible slip in the angular positions determined by the angle measuring unit 30 after a respective revolution. It is conceivable to arrange reference markings 48 at a plurality of angular positions. In FIG. 3, the reference marking 48 even is configured as a circumferential ring, which may comprise any desired number of codes and also improves robustness against external light.

Figure 4:
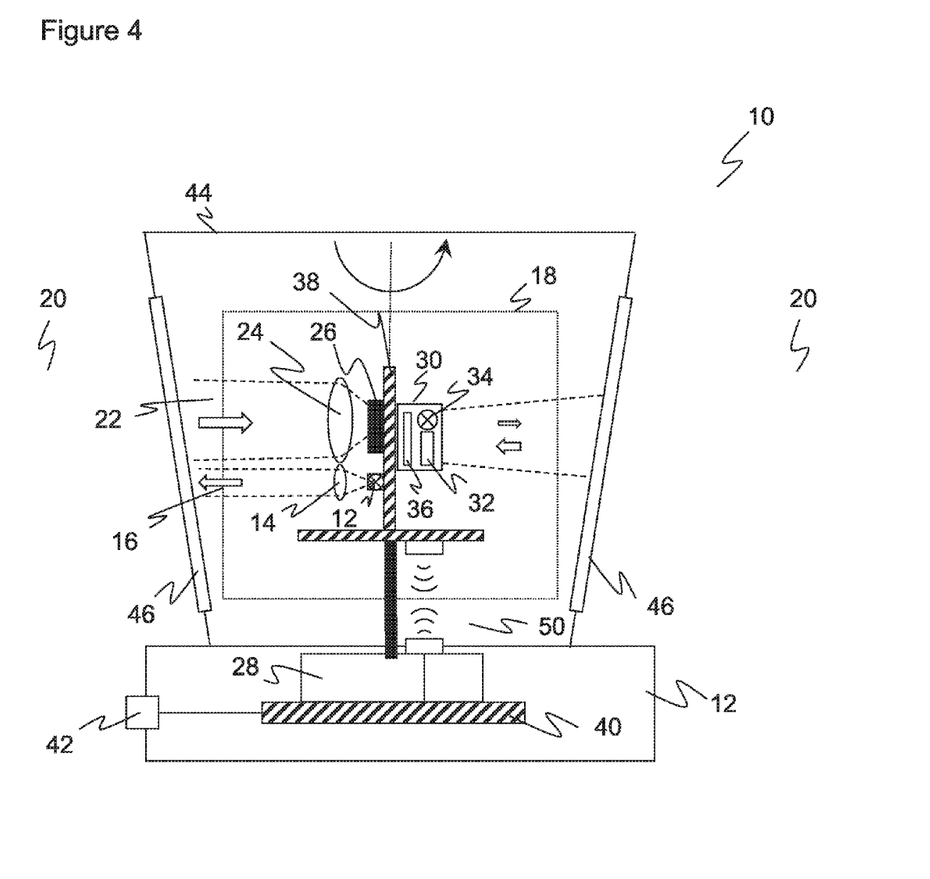
FIG. 4 a schematic sectional view of another embodiment of a laser scanner with an angle position determination based on a moving image sensor, which has a rotating measuring head instead of a rotary mirror.
Figure 5:
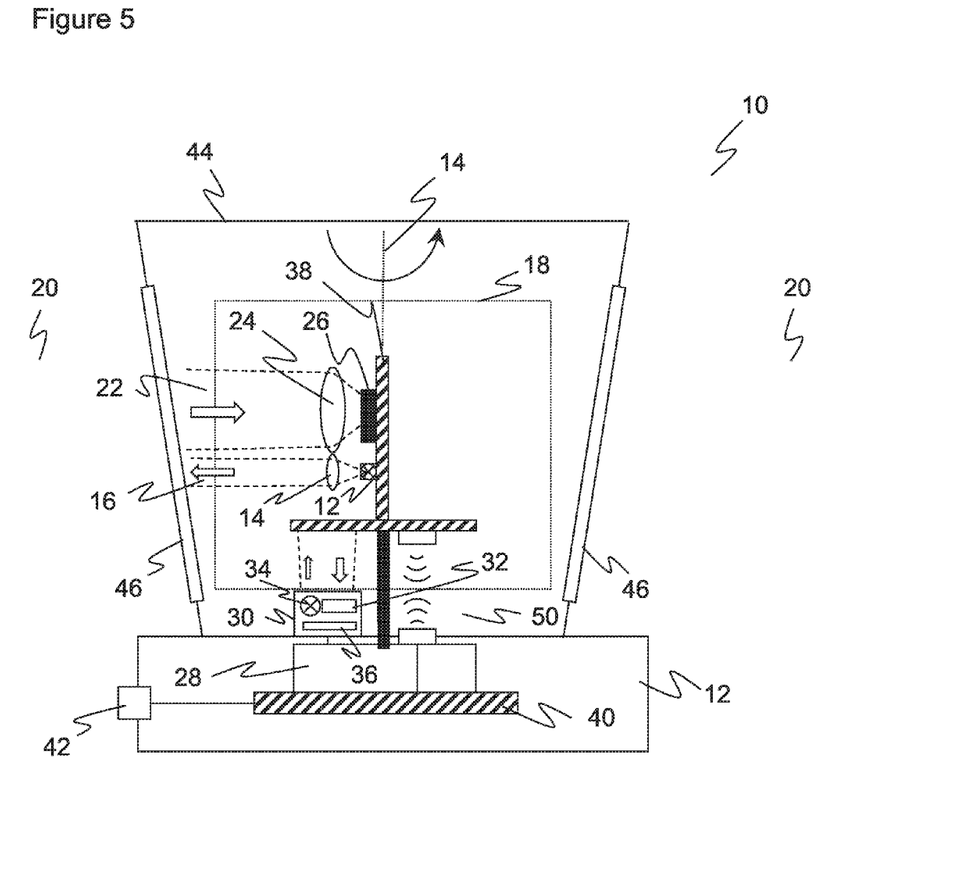
FIG. 5 a schematic sectional view of another embodiment of a laser scanner similar to FIG. 4, but with an image sensor in the stationary part of the laser scanner.

FIGS. 4 and 5 show sectional views of further embodiments of a laser scanner 10 wherein the deflection unit 18 is not a rotary mirror. Instead, a rotating measuring head is provided. Therefore, the deflection unit is provided as a scanning unit in which light transmitter 12 and light receiver 26 including optics 14, 16 rotate. The evaluation functionality can be virtually arbitrarily distributed between the rotating scanning unit, for example the circuit board 38, and the stationary evaluation unit 40. For data transmission at least in the direction towards the evaluation unit 40, preferably bidirectionally, a wireless communication interface 50 is provided. This can be done in any known technology such as optical, capacitive, inductive or via radio. A wired alternative via sliding contacts is also conceivable. Similar remarks apply to a power supply for the moving elements in the deflection unit 18.

In the embodiment according to FIG. 4, the angle measuring unit 30 rotates with the deflection unit 18 and is arranged in the direction of the front screen 46. The angle measuring unit 30 is arranged with an angular offset with respect to light transmitter 12 and light receiver 22, preferably in the vicinity of 180°, so that the two systems do not interfere. The spatial arrangement as shown on a front and rear side of the circuit board 38 is only an example, because by using corresponding housing part of the deflection unit 18, virtually any arrangement is conceivable. In the embodiment of FIG. 5, the angle measuring unit 30 is arranged in the stationary part of the laser scanner 10 and in the direction of the deflection unit 18. Both embodiments, in other respects, function analogously to the laser scanners 10 which have been explained with reference to FIGS. 1 to 3, including the possibility of using reference markings 48.

The angle measuring unit 30 may not only measure the horizontal, but also the vertical speed. As a result, additional information about the angular position can be obtained. One possible application is a laser scanner 10 having an extended monitoring area 20, where the deflection unit 18 not only rotates about an axis, but is also tilted. The additional information can also be used to determine parameters such as the smoothness of movement, to detect mechanical impacts, unbalances and the like, and thus to perform corresponding diagnostic functions. The data of the image sensor 32 can be used for further measurements, for example an ambient or external light measurement, glare detection, or detection of manipulations.

The invention claimed is:

1. An optoelectronic sensor (10) for detecting objects in a monitoring area (20), the sensor (10) comprising
a light transmitter (12) for transmitting a light beam (16),
a rotatable deflection unit (18) for periodically deflecting the light beam (16) in the monitoring area (20),
an angle measuring unit (30) for determining an angular position of the deflection unit (18),
a light receiver (26) for generating a reception signal from a reflected light beam (22) being remitted or reflected by the objects,
and an evaluation unit (40) configured to evaluate the reception signal for detecting the objects,
wherein the angle measuring unit (30) comprises an integrated system comprising:
an image sensor (32) moving with the deflection unit and arranged in the direction of a stationary part (44, 46) of the sensor (10),
or a stationary image sensor (32) arranged in the direction of the deflection unit (18),
and wherein the integrated system further comprises a computing unit (36) configured to determine a relative movement of the deflection unit (18) with respect to the sensor (10) from a signal of the image sensor (32), the relative movement is determined from the signal of the image sensor (32) and the computing unit (36) with an optical flow method.

2. The sensor (10) according to claim 1, the sensor (10) being configured as a laser scanner.

3. The sensor (10) according to claim 1, wherein the angle measuring unit (30) comprises an illumination unit (34).

4. The sensor (10) according to claim 1, wherein at least one reference marking (48) is arranged at the stationary part (44, 46) or at the deflection unit (18) in a known angular position.

5. The sensor (10) according to claim 1, wherein the deflection unit (18) comprises a rotary mirror, and wherein the image sensor (32) is arranged at the rear side of the rotary mirror.

6. The sensor (10) according to claim 1, wherein the deflection unit (18) is configured as a rotating scanning unit which comprises the light transmitter (12) and the light receiver (26), and wherein the image sensor (32) is arranged on the scanning unit at an angular offset with respect to the light transmitter (12) and the light receiver (26).

7. The sensor (10) according to claim 1, the sensor (10) comprising a front screen (46), with the image sensor (32) being arranged in the direction of the front screen (46), wherein the computing unit (36) is configured to detect a contamination of the front screen (46) from the signal of the image sensor (32).

8. The sensor (10) according to claim 7, wherein a reference signal for a front screen (46) without contamination is stored in the computing unit (36).

9. The sensor (10) according to claim 1, the sensor (10) being configured as a safety sensor and comprising a safe output (42), wherein the evaluation unit (40) is configured to determine whether there is an object in a protected field within the monitoring area (20) and to then output a safety-related stop signal via the safe output (42).

10. The sensor (10) according to claim 9, wherein the evaluation unit (40) is configured to output a safety-related stop signal when there is a contamination of the front screen (46) in connection with a protected field.

11. The sensor (10) according to claim 1, wherein the computing unit (36) is configured to also detect a relative movement of the deflection unit (18) with respect to the stationary part (44, 46) in a direction transverse to the rotary movement of the deflection unit (18).

12. A method for detecting objects in a monitoring area (20), the method comprising the steps of transmitting a light beam (16), periodically deflecting the light beam (16) in the monitoring area (20) by means of a deflection unit (18), generating a reception signal from a reflected light beam (22) remitted or reflected by the objects, and evaluating the reception signal for detecting the objects, wherein a respective angular position of the light beam (16) transmission is determined, wherein for measuring the angular position an integrated system comprising a computing unit (36) and either:

an image sensor (32) which is arranged in the direction of a stationary part (44, 46) is moved with the deflection unit (18), or a stationary image sensor (32) is arranged in the direction of the deflection unit (18), and wherein a relative movement of the deflection unit (18) with respect to the stationary part (44, 46) is determined from the signal of the image sensor (32), the relative movement is determined from the signal of the image sensor (32) and the computing unit (36) with an optical flow method.

13. The method according to claim 12, wherein the image sensor (32) is arranged in the direction of a front screen (46), and wherein additionally a contamination of the front screen (46) is detected from the signal of the image sensor (32).

14. The method according to claim 13, wherein the contamination is detected by comparison with a reference signal for a front screen (46) without contamination.

15. An optoelectronic sensor (10) for detecting objects in a monitoring area (20), the sensor (10) comprising a light transmitter (12) for transmitting a light beam (16), a rotatable deflection unit (18) for periodically deflecting the light beam (16) in the monitoring area (20), an angle measuring unit (30) for determining an angular position of the deflection unit (18), a light receiver (26) for generating a reception signal from a reflected light beam (22) being remitted or reflected by the objects, and an evaluation unit (40) configured to evaluate the reception signal for detecting the objects, wherein the angle measuring unit (30) comprises an integrated system comprising an image sensor (32) moving with the deflection unit and arranged in the direction of a stationary part (44, 46) of the sensor (10), and wherein the integrated system further comprises a computing unit (36) configured to determine a relative movement of the deflection unit (18) with respect to the sensor (10) from a signal of the image sensor (32), the relative movement is determined from the signal of the image sensor (32) and the computing unit (36) with an optical flow method.

\* \* \* \* \*